United States Patent [19]
Auracher

[11] Patent Number: 4,783,852
[45] Date of Patent: Nov. 8, 1988

[54] METHOD AND APPARATUS FOR ACQUIRING INFORMATION USING A RELATIVE PHASE DEVIATION OF THE OPTICAL SIGNAL OF A LOCAL OSCILLATOR OF A HOMODYNE RECEIVER

[75] Inventor: Franz Auracher, Baierbrunn, Fed. Rep. of Germany

[73] Assignee: Siemens Aktiengesellschaft, Berlin and Munich, Fed. Rep. of Germany

[21] Appl. No.: 894,662

[22] Filed: Aug. 8, 1986

[30] Foreign Application Priority Data

Sep. 18, 1985 [DE] Fed. Rep. of Germany ....... 3533327

[51] Int. Cl.$^4$ .......................... H04B 9/00; G01B 9/02
[52] U.S. Cl. .................................... 455/619; 455/617; 356/349
[58] Field of Search ...................... 455/609, 617, 619; 350/96.11; 356/349

[56] References Cited

U.S. PATENT DOCUMENTS

| | | | |
|---|---|---|---|
| 4,195,221 | 3/1980 | Moran | 455/609 |
| 4,468,766 | 8/1984 | Spezio | 455/619 |
| 4,648,134 | 3/1987 | Stewart | 455/619 |

FOREIGN PATENT DOCUMENTS 2167258  5/1986 United Kingdom ................ 455/609

OTHER PUBLICATIONS

Applied Optics, vol. 23, No. 4, Feb. 1984–p. 523.
IEEE Proceedings of the First European Conference on Integrated Optics, 14–15 Sep. 1981 by Le N. Binh, An Ultra-Wideband Acoustooptic Mode Converter Using guided Waveguide Structures.
IEEE Proceedings of the First European Conference on Integrated Optics London, 14–15 Sep. 1951 Optical Network Analysis by Phase Modulated Single Side Band Detection by E. Voges, O. Ostewald, B. Schiek, A. Neyer.
Applied Physics Letter 36, 15 Apr. 1980, Method for Measuring the rf Modulation Characteristics of Mach-Zehndertype Modulators, by F. Aurcher and R. Keil, pp. 626–629.
Applied Physics Letter 45, 1984 Integrated Optical Frequency Translator with Stripe Waveguide, by Heismann and R. Ulrich.
IEEE Journal of Quantum Electronics, vol. QE-18, No. 4, Apr. 1982, Integrated-Optical Single-Sideband Modulator and Phase Shifter, by Fred Heismann and Reinhard Ulrich.

*Primary Examiner*—Robert L. Griffin
*Assistant Examiner*—Andrew J. Telesz, Jr.
*Attorney, Agent, or Firm*—Hill, Van Santen, Steadman & Simpson

[57] ABSTRACT

Method and apparatus for acquiring information using a relative phase deviation between the phase of a receipt signal of an optical homodyne receiver and the phase of an optical signal of a local oscillator of the receiver. Previously information had to be taken from a control signal included in a larger DC signal. The compensation for the DC component is difficult. So as to make this unnecessary, the frequency $F_{Lo}$ of the local oscillator is shifted by the frequency $f_H$ of a defined auxiliary carrier and the frequency-shifted optical signal is then superimposed on the optical receive signal and is detected. The detected signal is band-pass-filtered and is shifted to the baseband frequency by mixing with the same auxiliary carrier and then is low-passed filtered. The DC voltage obtained indicates the relative phase relationship between the local oscillator and the receive signal based on the sign of the signal and indicates the absolute phase deviation by its amplitude. The DC voltage signal can then be supplied to a control loop so as to make this signal as small as possible.

16 Claims, 2 Drawing Sheets

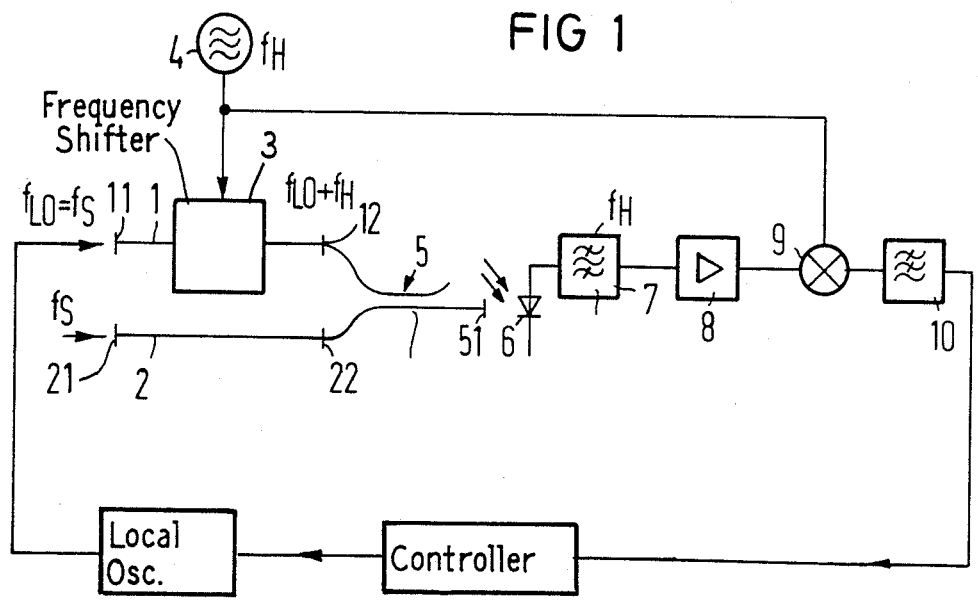
FIG 1
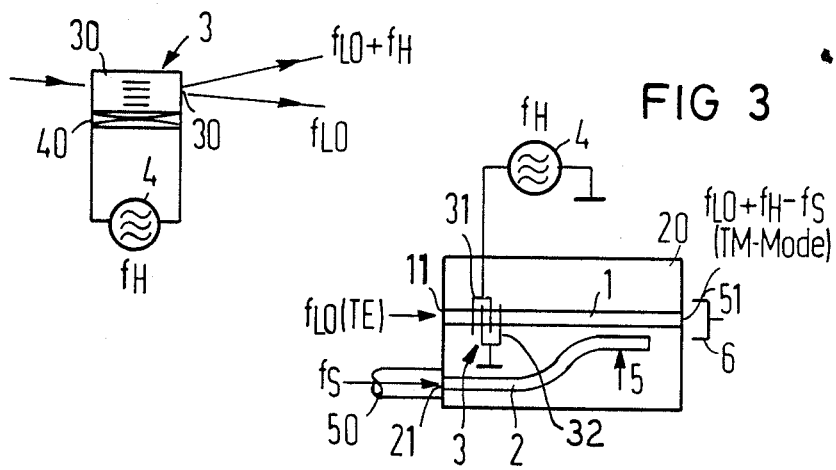
FIG 2
FIG 3
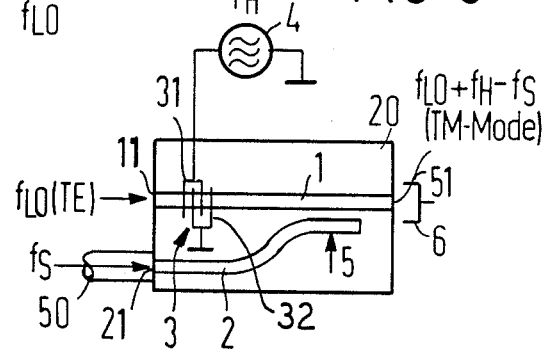

METHOD AND APPARATUS FOR ACQUIRING INFORMATION USING A RELATIVE PHASE DEVIATION OF THE OPTICAL SIGNAL OF A LOCAL OSCILLATOR OF A HOMODYNE RECEIVER

BACKGROUND OF THE INVENTION

1. Field of the Invention

The present invention relates in general to a method and apparatus for acquiring information using the relative phase deviation between the phase of a received signal of an optical homodyne receiver and the phase of the optical signal of a local oscillator wherein the frequency of the signal of the local oscillator is shifted by the frequency of an auxiliary carrier oscillator and the frequency shifted optical signal is then superimposed upon the received optical signal and detected.

2. Description of the Prior Art

The present standard form of optical communication technology with intensity modulation is based on direct detection reception such as was standard in radio technology until 1930. As in radio technology, the application of heterodyne reception also gives advantages for optical communication technology. These are:

1. Higher receiver sensitivity and, thus, greater repeater section lengths;
2. More favorable modulation and demodulation methods;
3. The possibility of employing optical repeaters; and
4. Increases in the channel capacity by means of an optical frequency division multiplex method.

Of the possible heterodyne methods, homodyne techniques together with phase keying modulation theoretically yields the greatest improvements over direct detection reception. Patricularly given homodyne reception, only the same bandwidth as required in direct detection reception is required, whereas at least three times the bandwidth is required at the optical receiver using heterodyne reception, and this causes extremely expensive IF technology where high bit rates are involved.

The difficulties in homodyne reception lie in the high demand made on the optical transmitter, or, respectively, the local oscillator with respect to its frequency stability and phase noise since the local oscillator must be synchronized and phase-locked with the transmitter. A PLL (phase locked loop) circuit serves this purpose and must have a band width of about 25 MHz assuming a line width of the transmitter or local oscillator of 1 MHz.

Using the current technology for a phase control of the local oscillator, a weak DC signal must be obtained from the detected optical power as a control variable which is superimposed by a significantly greater intensity-dependent current. The compensation of the dominating intensity-dependent DC is difficult and also a DC-coupled control circuit is undesirable because of the 1/f noise drift of the repeaters.

SUMMARY OF THE INVENTION

It is an object of the present invention to provide a method for acquiring information using a relative phase shift between the phase of a received signal of an optical homodyne receiver and the phase of the optical signal of a local oscillator of such receiver wherein the compensation of dominating intensity-dependent DC is not required.

The object of the present invention is accomplished wherein the frequency of the signal of the local oscillator is shifted by the frequency of an auxiliary carrier oscillator and the frequency-shifted optical signal is then superimposed upon the received optical signal before detection.

The method according to the invention allows a non-DC-coupled control circuit to be used and the information relative to phase difference between the optical signal of the local oscillator and the received signal is contained on the carrier.

The detected signal is then band pass-filtered and shifted to baseband frequency using a mixer having the same carrier frequency as the auxiliary carrier frequency.

This signal which has been shifted to the basebands frequency is then low-pass filtered and after low-pass filtering, a DC voltage signal is obtained which has an operational sign that indicates the relative phase relationship between the signal of the local oscillator and the received signal and the amplitude corresponds to the absolute phase deviation.

In a method for controlling the phase of the local oscillator of an optical homodyne receiver relative to the phase of the received signal, the frequency of the local oscillator is shifted around the frequency of a defined carrier and the frequency-shifted optical signal is superimposed on the optical received signal and is then detected after which the detected signal is band-pass-filtered and is shifted to the baseband frequency using a mixer with the same carrier which is then low-passfiltered and the low-pass-filtered signal is supplied to a control loop to control the phase of the local oscillator so as to set it until the feedback signal is minimum. The detected signal can also be amplified in the system.

An electrical or acoustic auxiliary carrier is preferably employed as the auxiliary carrier signal.

An apparatus for implementing the method of the invention comprises an optical frequency shifter which receives the optical signal of the local oscillator and the output of an auxiliary carrier oscillator to shift the frequency by the frequency of the carrier and an optical detector which receives the frequency shifted signal from the frequency shifter and the received signal which have been superimposed.

By using an optical waveguide the optical signal of the local oscillator and from the auxiliary carrier oscillator is coupled at one end after passing through the frequency shifter and the received signal is supplied to another optical waveguide and an optical waveguide coupler is connected to the other ends of both waveguides which superimposes the supplied frequency shifted signal and the received signal and produces an output which is the superimposed signal which is supplied to the optical detector.

The optical waveguide coupler may be an optical directional coupler.

The frequency shifter may take different forms, for example, the frequency shifter may be composed of an acousticoptical light deflector, wherein the light deflected by the light deflector is superimposed with the received signal and is supplied to the detector. The light emitted by the optical local oscillator may be partially deflected in this acousto-optical deflector, for example, with a Bragg cell. The deflected light is frequency-shifted by the sound frequency with which the deflector is operated. This sound frequency thus forms the frequency of the auxiliary carrier. The non-deflected portion of the light does not have any frequency shift and can be employed as the local oscillator signal for the homodyne reception. The deflected and frequency-shifted portion can be employed for generating a control signal for the control loop.

Instead of an integrated execution of the acousto-optical deflector, it may be executed in waveguide technology. Using waveguide-technology, the frequency shifter may be composed of a guided acoustic field in which a mode conversion occurs due to an acousto-optical interaction such that the frequency of the converted mode is shifted by the frequency of the sound wave. A polarization rotation of the guided light which results in a mode conversion of the TE mode into the TM mode occurs in the acousto-optical interaction. For an article which explains this, see the article by Le N. Binh, entitled "An Ultra-Wide Band Acousto-Optic Mode Converter Using Guided-Wave Structures", IEE Proc. of the first European Conference on Integrated Optics, Sept. 14–15, 1981, published in London. The frequency of the converted mode is then shifted by the frequency of the acoustic wave or sound wave. By way of example, by using a mode converter or, respectively, a polarization converter, the original mode can be used for homodyne detection and the converted mode can be employed for PLL control.

Instead of the acousto-optical effect, the electrooptical effect can be employed for frequency shifting. The frequency shifter in this case comprises an optical phase modulator which varies the phase of the transmitted light according to an uneven function of time. Any arbitrary signal having a shape u(t) in the form of a function of the time can thereby be employed as long at the function u(t) is an uneven function of time, which is used so as to produce single-side band modulation. See for example, the article by E. Voges, O. Oswald, B. Schiek, A. Neyer: entitled "Optical Network Analysis for Phase Modulated Single Sideband Detection", *IEE Proc.* of the first *European Conference on Integrated Optics* of Sept. 14–15, 1981, London.

The phase modulator used as a single-sideband modulator changes the phase of the light linearly with time. When, for example, a voltage $u(t) = c \cdot t$ which changes linearly with time which is applied to the electrodes of the phase modulator, then the phase of the light emitted by the local oscillator changes linearly with time, for example according to $d\phi(t) = k \cdot t$ and the frequency of the light thus shifts by $\phi/dt = k$. In these equations, t represents time and c and k are constants.

Instead of using linearly rising voltages, a sawtooth voltage can also be applied, so that the phase modulator modulates the phase of the light in a sawtooth fashion as a function of time. The frequency shift is then proportional to the amplitude and is inversely proportional to the period of the sawtooth voltage.

Simple arrangements are available wherein the frequency shift depends on the amplitude of the control voltage which is applied to the electrodes of a phase modulator.

An arrangement utilizes an optical interferometer in a waveguide which has two arms into which the signal of the local oscillator can be coupled and in which the light is phase-modulated with control signals which are shifted in phase by 90°. After superimposition of the phase-modulated lightwaves at the ouput of the interferometer, a single-sideband-modulated signal is obtained, and the frequency shift for the first sideband is equal to the electrical modulation frequency at the phase modulators. See for example, the article by F. Auracher, R. Keil; entitled "Method for Measuring the rf Modulation Characteristics of Mach-Zehner-Type Modulators", *Appl. Phys. Lett.* 36 (1980) pages 626–629).

The optical waveguide in which the optical frequency shifter is arranged can be an electro-optical crystal and the frequency shifter may be an apparatus for applying an electrical traveling field to the optical waveguide. Such embodiment represents a further modification of the optical frequency shifter. A phase adaptation for matching the TE mode and the TM mode is achieved using the traveling field so that the conversion of the TE mode into the TM mode occurs. The converted mode is then frequency shifted as described in the article by F. Heismann, R. Ulrich: "Integrated-optical Frequency Translator With Strip Waveguide", in the *App. Phys. Lett.* 45 (1984), pages 490–492. A similar frequency shifter is described in the article by F. Heismann, R. Ulrich: "Integrated-optical Single Sideband Modulator and Phaseshifter", appearing in the *IEEE Journal, Quant. Electr.* QE-18 (1982), pages 767–771).

An apparatus for applying the traveling field comprises a series of electrodes arranged above the waveguide and comprises a control means for driving the electrodes with phase-shifted control signals in another embodiment.

Certain of the modifications disclose apparatuses which are suitable for integrating on a planar substrate. Particularly suitable as a substrate material are $LiNbO_3$ as well as GaAs or InGaAsP because electro-optical and acousto-optical components in waveguide technology can be manufactured in these materials. The integration of semi-conductor transmitters and detectors can also be accomplished in GaAs or InGaAs systems.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure in which:

BRIEF DESCRIPTION OF THE DRAWINGS

FIG. 1 is a block circuit diagram of an apparatus for obtaining information using the relative phase deviation between the phase of the received signal of an optical homodyne receiver and the phase of the optical signal of the local oscillator.

FIG. 2 illustrates a first arrangement for the optical frequency shifter;

FIG. 3 illustrates another arrangement of the optical frequency shifter;

DESCRIPTION OF THE PREFERRED EMBODIMENTS

Figure 4:
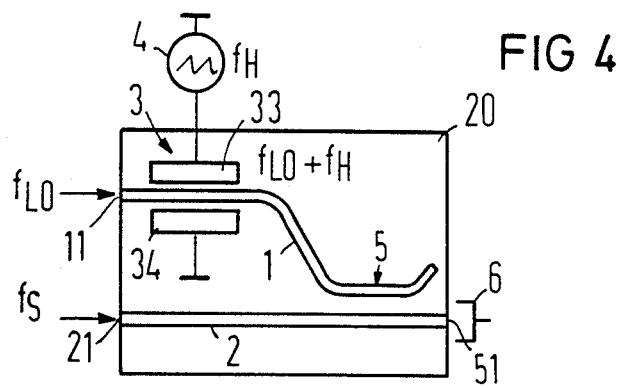
FIG. 4 illustrates a third arrangement of the optical frequency shifter.

To assist in understanding the present invention, comparison will be made to an optical homodyne receiver disclosed in the article by Walter R. Leeb, Heinz K. Philip, Arpad L. Schotz entitled "Homodyne Receiver for ASK Signals at 10 μm Wavelength", *Appl.*

Optics 4 of 1984 page 523 which shows a block circuit diagram in FIG. 1 which is currently being tested in laboratories. The received signal is identified as $e_1$ and the signal of the local oscillator is identified as $e_0$. A part of the local oscillator signal is phase-shifted by 90° and is superimposed on a part of the received signal and is detected with a photodiode.

In the superposition of the field strength $E_s$ of the received signal which arrives at the receiver with a field strength of $E_{Lo}$ of the signal of the local oscillator in the photo diode, a detector current results:

$$i_{ol} \sim [E_s \sin(\omega_s t + \phi_s) + E_{Lo}\sin(\omega_{Lo} t + \phi_{Lo})]^2 = \frac{E_{Lo}^2}{2} + \underbrace{\frac{1}{2} E_{Lo} E_s \cos(\phi_s - \phi_{Lo})}_{\text{Homodyne signal}} + \frac{E_s^2}{2} + \cdots$$

whereby $\omega_s$ is $2\pi f_s$, $\omega_{Lo} = 2\pi f_{Lo}$, $f_s$ is the carrier frequency of the transmitter, $f_{Lo}$ is the carrier frequency of the local oscillator and the sign $\sim$ means proportional to, $E_{Lo} = E_s$. The PLL circuit must make the phase difference $\Delta\phi = \phi_s - \phi_{Lo}$ between the phase $\phi_s$ of the transmitter and the phase of the local oscillator to zero. So as that the control recognizes the operational sign of $\Delta\phi$, a signal of the local oscillator is shifted by 90°, or respectively, by one quarter of the wavelength of the light is superimposed with the signal coming from the transmitter or with the received signal in a control loop and is then detected. The corresponding detector current will be $$i_{D2} \sim \left[ E_s \sin(\omega_s t + \phi_s) + E_{Lo}\sin(\omega_{Lo} t + \phi_{Lo}) + \frac{\pi}{2} \right]^2 = \left[ \frac{E_{Lo}^2}{2} + \frac{E_s^2}{2} + \frac{1}{2} E_{Lo} E_s \sin(\phi_s - \phi_{Lo}) + \cdots \right]$$

In order for the PLL circuit to recognize the operation sign of the phase difference, that part of the detector current coming from the local oscillator which is proportional to $E^2_{Lo}/2$ must be compensated. This compensation is very difficult because $E_{Lo}$ is significantly greater than $E_s$ and, therefore, the quantity to be compensated is significantly greater than the actual signal used for the PLL circuit which is established by $(E_{Lo}E_s \sin(\phi_{Lo} - \phi_s))/2$. Since the operational sign of the phase deviation is important for the control, the controlled-gain amplifier must also be DC voltage coupled, so that problems of drift and 1/f noise make the control more difficult.

So as to avoid such disadvantages, the signal and specifically a part of the signal of the local oscillator, is phase shifted by 90° and is additionally frequency shifted by the frequency $f_H$ of an auxiliary carrier in the method of the invention. This frequency shifted signal is then superimposed on the received signal and specifically with a portion of the received signal and is detected with a photodiode.

The frequency of the auxiliary carrier must be selected such that it can be easily separated from all modulation frequencies occurring at the transmitter. If necessary, a corresponding filter can be provided at the transmitter for suppressing frequencies which are close to the frequency $f_H$. The detector then supplies a current $$i_D \sim \left\{ E_H \sin\left[(\omega_s + \omega_H)t + \phi_H + \phi_{Lo} + \frac{\pi}{2}\right] + E'_s \sin(\omega_s t + \phi_s) \right\}^2 = \frac{E_H^2}{2} + \frac{E'^2_s}{2} - \frac{E_H E_s}{2} \sin(\omega_H t + \phi_H + \phi_{Lo} - \phi_s) + \cdots$$

Where $E_H$ and $\phi_H$ are the field strengths or the phase angle of the frequency shifted signal of the local oscillator. The phase information $\phi_s - \phi_{Lo}$ has been modulated onto a carrier having the frequency $f_H = \omega_H/2\pi$ and, after a narrow-band filtering and amplification is mixed down to the baseband frequency by a further superposition with the frequency $f_H$ of the auxiliary carrier (homodyne or lock-in detection):

$$E_H E_s \sin(\omega_H t + \phi_H + \phi_{Lo} - \phi_s) \cdot \cos(\omega_H t + \phi_H) =$$

$$\frac{E_H E_s}{4} \sin(\phi_{Lo} - \phi_s) + \frac{E_H E_s}{4} \sin(2\omega_H t + 2\phi_H + \phi_{Lo} - \phi_s)$$

The mixing term having the double frequency of the auxiliary carrier is filtered out using a low-pass filter.

Since the oscillator for the auxiliary carrier is located at the receiver, this signal is available undistorted and without phase errors and is available for upward mixing and following downward mixing, so that the phase information $\phi_s - \phi_{Lo}$ can be very accurately obtained.

FIG. 1 illustrates a block circuit diagram of an apparatus which can be used in the method of the invention. It includes an optical waveguide 1 which receives at one end the optical signal from the local oscillator having a frequency $f_{Lo} = f_s$. This signal is coupled into the waveguide at the end 11 and a frequency shifter 3 is arranged in the waveguide 1. The frequency shifter 3 receives a frequency $f_H$ from an auxiliary carrier oscillator 4.

The received signal which has a frequency $f_s$ is coupled in at an end 21 of a second optical waveguide 2.

An optical directional coupler 5 is connected to the ends 12 and 22 of the two waveguides 1 and 2 and the optical directional coupler 5 superimposes the supplied frequency-shifted signal having the frequency $f_{Lo} + f_H$ and the received signal which has a frequency of $f_s$ and produces an output of the superimposed signal at an output 51 which is adjacent the window of an optical detector 6.

The information regarding the phase difference between the signal of the local oscillator and the received signal is contained in the output signal of the detector 6 and is contained on an electrical carrier having a frequency of $f_H$. This output signal from the detector 6 is passed to a band-pass filter 7 and is then amplified in an amplifier 8 and is shifted to the baseband frequency using a mixer 9 which receives the auxiliary carrier oscillator frequency $f_H$. A low-pass filter 10 receives the output of the mixer 9 to obtain a DC voltage signal and the operational sign of this DC voltage signal indicates the relative phase relationship between the signal of the local oscillator and the received signal and the amplitude of the DC signal corresponds to the absolute phase deviation. The DC voltage signal is supplied to a controller for controlling the phase of the local oscillator which supplies the input to the terminal 11 which might, for example, be a PLL control circuit which is operated so that the DC voltage signal at the output of the lowpass filter 10 becomes as small as possible.

In FIG. 1 as well as in FIGS. 2 through 6, a phase shift of the signal of the local oscillator by 90° is assumed for the PLL circuit.

FIG. 2 shows an optical frequency shifter 3 which is in the form of an acousto-optical deflector which is composed of an acoustic transducer 40 which is operated with the frequency $f_H$ of the oscillator 4 and of a Bragg deflector 30. The light signal of the local oscillator having the frequency $f_{Lo}$ is partially deflected in the deflector 3. The deflected light is frequencyshifted by the acoustic frequency $f_H$ of the deflector 3 and thus has a frequency of $f_{Lo}+f_H$. The non-deflected portion does not have any frequency shift and therefore has a frequency of $f_{Lo}$.

FIGS. 3 through 6 illustrate different embodiments of the optical frequency shifter 3 formed in waveguide techniques. The waveguides 1 and 2 of FIG. 1 and the directional coupler 5 are composed of strip waveguides which are formed on or in a substrate 20 of electro-optical material. The strip waveguides 1 and 2 merge into the parallel strip waveguides of the directional coupler 5 without interruption.

FIG. 3 iluustrates a frequency shifter 3 which is composed of an electrode structure in the form of two electrode combs 31 and 32 which have their teeth interspersed between each other and wherein the teeth extend perpendicular to the longitudinal direction of the waveguide 1. One of the two electrode combs, for example, the electrode comb 32, is electrically connected to ground and the other comb 31 receives a control voltage having a frequency of $f_H$ from the oscillator 4. The substrate material in which the waveguides are located must be either piezo-electric, as for example, $LiNbO_3$, InP, quartz crystal or a piezo-electric layer as for example ZnO, must be applied to the substrate and the electrode structure must be applied to such piezo-electric layer. An acoustic-field guided in the waveguide 1 is generated by means of the electrode structures so that both the light of the local oscillator having the frequency $f_{Lo}$ and the TE mode coupled into the waveguide 1 through the end 11 as well as the acoustic field guided in the waveguide 1. As a result of the acousto-optical interaction, a polarization rotation, or respectively, a mode conversion of the guided light occurs from the TE mode into the TM mode. The frequency of the TM mode emerging from the acoustic field is shifted by the frequency $f_H$ of the acoustic wave.

Figure 5:
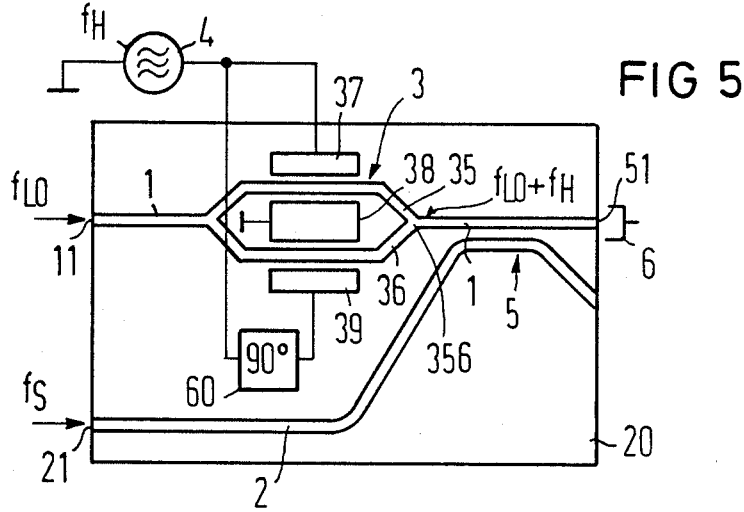
FIG. 5 illustrates a fourth arrangement of the optical frequency shifter.
Figure 6:
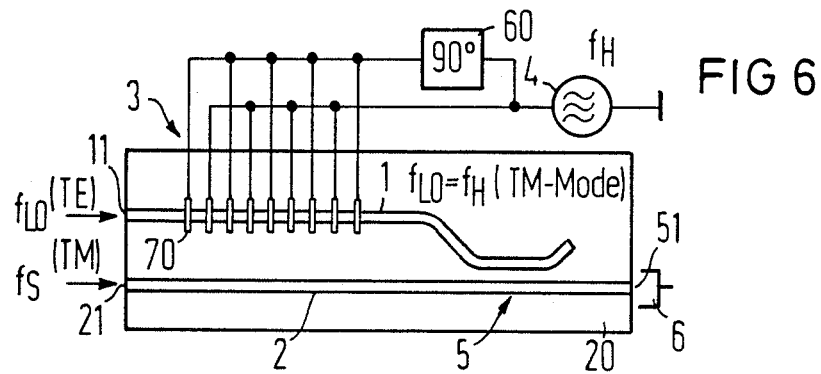
FIG. 6 illustrates a fifth arrangement of the optical frequency shifter.

Utilizing the apparatus shown in FIG. 1 and using the frequency shifters 3 illustrated in FIGS. 4, 5, and 6, the received signal having the frequency $f_s$ is coupled into the strip waveguide 2 through the end 21 and this received signal is supplied, for example, in an optical fiber light waveguide 50.

In the embodiment illustrated in FIG. 4, the electro-optical effect is employed for frequency shifting instead of the acousto-optical effect. The frequency shifter 3 is formed of a phase modulator which is employed as a sideband modulator. The phase modulator itself is composed of two electrodes 33 and 34 formed on the electro-optical substrate 20 and which are arranged at both sides of the waveguide 1 and proceed parallel thereto. One of the two electrodes, for example the electrode 34, is electrically connected to ground and the other electrode 33 receives a sawtooth control voltage from the oscillator 4.

As previously mentioned the embodiment of FIG. 4 has simple construction, but the fequency shift also depends on the amplitude of the applied control voltage. This dependency does not occur in the embodiment of FIG. 5. In the embodiment of FIG. 5, a double armed interferometer formed in waveguide technique is arranged in the waveguide 1, and the arms are composed of the two strip waveguides 35 and 36. Two electrodes 37 and 38 or 39 on the electro-optical substrate are arranged on both sides of each waveguide 35 and 36 and extend parallel thereto. For the sake of simplicity, the electrodes arranged between the two strip waveguides 35 and 36 are combined to form a single electrode 38 and this electrode is connected to ground. The electrode 37 receives a control voltage with a frequency of $f_H$ from the oscillator 4 and the electrode 39 receives a control voltage from the oscillator 4 which has been phase-shifted by 90° by the phase shifter 60. As a result of this arrangement, the two arms 35 and 36 of the interferometer are phase-modulated with signals which are phase-shifted by 90°. After the superposition of the phase modulated lightwaves at the output 356 of the interferometer, a single sideband-modulated signal is obtained wherein the frequency shift for the first sideband is equal to the frequency $f_H$ of the control voltage at the phase modulators which are respectively formed by the electrodes 37 and 38 or, respectively, 38 and 39.

FIG. 6 illustrates an embodiment wherein frequency shifter 3 comprises a row of electrodes 70 which are arranged on the electro-optical substrate 20 above the waveguide 1 with the electrodes following one another in the longitudinal direction and are connected to a control device 60 which is a phase-shifter for driving the electrodes with the phase-shifted control voltage. The control means is formed such that proceeding from and including a first electrode 70, every second electrode 70 receives the control voltage having the frequency $f_H$ from the oscillator 4 and the remaining electrodes receive the control voltage which has been phase-shifted by 90°. As a result of this arrangement of the electrodes 70, the electrical traveling field is applied to the waveguide 1 which is fashioned in a substrate in the form of an electro-optical crystal. This signal of the local oscillator is coupled into the waveguide 1 in the TE mode. A phase adaptation or matching between the TE mode and the TM mode is accomplished with the traveling field so that a conversion of the TE mode into the TM mode occurs and the TM mode is frequency shifted by the frequency $f_H$ after exiting from the traveling field. The received signal is coupled into the waveguide 2 in the TM mode.

It is seen that this invention provides a new and novel method and apparatus for the acquisition of information and although it has been described with respect to preferred embodiments, it is not to be so limited as changes and modifications can be made therein which are within the full intended scope as defined by the appended claims.

I claim:

1. A method for the acquisition of information by way of a relative phase deviation between the phase of a received signal of an optical homodyne receiver and the phase of the optical signal of a local oscillator of said receiver, characterized in that the frequency ($f_{Lo}$) of the signal of said local oscillator is shifted by the frequency ($f_H$) of an auxiliary carrier and the frequency-shifted, optical signal is then superimposed upon the optical received signal and is detected, characterized in that the detected signal is band-passfiltered and is then shifted to the baseband frequency by mixing it with the same auxiliary carrier frequency, and characterized in that the signal which is shifted to the baseband frequency is low-pass-filtered wherein a controller receives the low-passfiltered signal and provides an output to said local oscillator to control the phase of the optical signal of said local oscillator.

2. A method for controlling the phase of a local oscillator of an optical homodyne receiver relative to the phase of the received signal of said receiver, characterized in that the frequency ($f_{Lo}$) of said local oscillator is shifted by the frequency ($f_H$) of an auxiliary carrier and the frequencyshifted, optical signal is superimposed on the optical received signal and is detected to produce a detected signal, said detected signal is band-pass-filtered and is shifted to the baseband frequency by mixing it with the same auxiliary carrier frequency and this signal is low-pass-filtered; and the low-pass-filtered signal is supplied to a control loop to control the phase of said local oscillator which is adjusted until said low-pass filtered signal becomes minimum.

3. A method according to claims 1 or 2, characterized in that the detected signal is amplified.

4. A method according to claims 1 or 2, characterized in that an electrical or acoustic auxiliary carrier is employed as said auxiliary carrier.

5. Apparatus for the acquisition of information comprising a local oscillator, an auxiliary carrier oscillator, an optical detector, an optical frequency shifter (3) connected to receive an optical signal of said local oscillator and which shifts the frequency ($f_{Lo}$) of said local oscillator by a frequency ($f_h$) from said auxiliary carrier oscillator, an optical waveguide (1) into which the optical signal of siad local oscillator can be coupled at one end (11) and in which said frequency shifter (3) is mounted; another optical waveguide (2) into which a received signal can be coupled at an end (21); and an optical waveguide coupler (5) connected to the other ends (12, 22) of said waveguides (1, 2), said optical waveguide coupler superimposing the said received frequency-shifted signal and the received signal and producing at its output the superimposed signal at an output (51) to which said optical detector is coupled.

6. Apparatus according to claim 5, characterized in that said optical waveguide coupler (5) is formed of an optical directional coupler.

7. Apparatus according to claims 5 or 6, characterized in that the optical waveguide (1) in which the optical frequency shifter (3) is arranged is formed as in an electro-optical crystal; and the frequency shifter (3) is formed of a device for applying an electrical traveling field to said optical waveguide (1).

8. Apparatus according to claim 7, characterized in that the device for applying said traveling field comprises a row of electrodes arranged over said waveguide and comprises a control means for driving said electrodes with phase-shifted control signals.

9. Apparatus according to claims 5 or 6, characterized in that said frequency shifter (3) is formed of an acoustooptical light deflector, whereby the light deflected by said light deflector is supplied to said detector (6) superimposed with the received signal.

10. Apparatus according to claim 9, characterized in that said optical waveguide and said another waveguide (1, 2), said frequency shifter (3) and said waveguide coupler (5) are integrated on a planar substrate (20) in which electro-optical or acousto-optical components are formed using waveguide techniques.

11. Apparatus according to claim 10, characterized in that the material of said substrate is composed of LiNbO$_3$ or is selected from GaAs or InGaAsP.

12. Apparatus according to claims 5 or 6, characterized in that said frequency shifter (3) is formed of a guided acoustic field in which a mode conversion occurs due to an acousto-optical interaction, whereby the frequency of the converted mode is shifted by the frequency of the received signal.

13. Apparatus according to claims 5 or 6, characterized in that said frequency shifter (3) is composed of an optical phase modulator which modifies the phase of the incoming signal according to an uneven function of time.

14. Apparatus according to claims 5 or 6, characterized by an optical interferometer formed as a waveguide and comprising two arms (35, 36) into which the signal of the local oscillator can be coupled and in which the light is phase-modulated with control signals which are phase-shifted by 90°.

15. Apparatus according to claim 13, characterized in that said phase modulator modifies the phase of the light linearly with time.

16. Apparatus according to claim 13, characterized in that said phase modulator modifies the phase of the incoming signal with time in sawtooth fashion.

* * * * *